United States Patent [19] [11] 3,851,101
En et al. [45] Nov. 26, 1974

[54] ADAPTIVE PHASE SYNCHRONIZER

[75] Inventors: John En, Palatine; Daniel P. Brown, Elmhurst, both of Ill.

[73] Assignee: Motorla, Inc., Chicago, Ill.

[22] Filed: Mar. 4, 1974

[21] Appl. No.: 447,627

[52] U.S. Cl. .............. 178/69.5 R, 325/42, 328/155, 333/18 R
[51] Int. Cl. .............................................. H04l 7/00
[58] Field of Search ................ 178/69.5 R; 328/155; 333/18 R; 325/42

[56] References Cited

UNITED STATES PATENTS

| | | | |
|---|---|---|---|
| 3,594,502 | 7/1971 | Clark | 178/69.5 R |
| 3,678,200 | 7/1972 | Clark | 178/69.5 R |
| 3,758,861 | 9/1973 | DeJager et al. | 325/42 |

*Primary Examiner*—Eugene G. Botz
*Assistant Examiner*—Errol A. Krass
*Attorney, Agent, or Firm*—Eugene A. Parsons; Vincent J. Rauner

[57] ABSTRACT

An adaptive phase synchronizer for synchronizing the phase of received digital data with the phase of a local clock include means for taking multiple samples of each bit of the received data, modulo 2 adders and up-down counters for locating the transitions in the data bits, and phase correcting means responsive to said transitions for adjusting the phase of the data over a range in excess of one bit intervals in accordance with the locations of the transitions in the received data relative to the local clock pulses. Means are provided for rendering the phase correcting means non-responsive to the transitions in the data when more or less than one transition per bit occurs.

10 Claims, 3 Drawing Figures

PATENTED NOV 26 1974 3,851,101

SHEET 1 OF 2

SWITCHING LOGIC

| INITIAL SAMPLE SELECTED | STAGES SELECTED 3,4,5 ALWAYS SELECTED |
|---|---|
| 1 OR 2 | 1, 2, 6', 7' |
| 6 OR 7 | 6, 7, 1'', 2'' |
| 3, 4 OR 5 | 1, 2, 6, 7 |

ADAPTIVE PHASE SYNCHRONIZER

BACKGROUND OF THE INVENTION

1. Field of the Invention

This invention relates generally to synchronizing systems for synchronizing a received signal to a locally generated signal, and more particularly to systems for synchronizing received digital data to a local clock.

2. Description of the Prior Art

Several techniques for synchronizing digital data systems are known. One such system employs a filter tuned to the clock frequency to provide a clock frequency component from the received data which may be used to adjust the frequency of the local clock to correspond to the clock frequency of the received data. Another such system utilizes a local clock operating at an integral frequency multiple of the biti rate of the received data and a shift register for storing the samples. Adjacent ones of a samples are compared, and up counters are used to count the number of transitions occurring between each pair of samples. The output of one of the stages adjacent to a transition is then applied to signal utilization means.

Whereas these techniques provide a way to synchronize digital data to a local clock, the first system does not reject noise in the band of frequencies about the clock frequency, and since the clock frequency component of a received digital signal is generally small, loss of clock synchronization may occur at relatively strong signal levels. The sampling system has the advantage in that it can eliminate some of the noise in the band near the clock frequency, however, the buildup time of the counters is relatively slow, and the shifting of a transition between two samples as a result of noise or clock drift can cause the count in two of the counters to be nearly identical, thereby resulting in an ambiguous indication of the phase of the received digital signal. Furthermore, should the transition move from the first sample taken during each bit interval to the last sample, an entire bit can be erroneously removed from the bit stream. The removal of a bit can be disastrous to systems such as those using convolutional codes by causing parity bits to be diverted to an information register and the information bits to be diverted to a parity register.

SUMMARY OF THE INVENTION

It is an object of the present invention to provide a new adaptive phase synchronizing system that maintains the phase of the received digital signal continuously synchronized to the phase of the local clock.

It is another object of the present invention to provide a new synchronizing system that effectively eliminates noise within and without the band of frequencies occupied by the digital data signal.

It is a further object of this invention to provide a system capable of cancelling a plurality of incorrect noise bits with a single correct information bit.

It is yet another object of the present invention to provide a system that adjust to any drift more rapidly than systems of the prior art, and maintains the system in lock for a longer period of time.

Yet another object of the present invention is to provide an adaptive phase synchronizing circuit that does not add bits nor remove bits from the received digital signal.

In accordance with a preferred embodiment of the invention, a sampling register having a number of stages greater by one than the number of samples taken per bit is employed to sample the received data. Modulo 2 adders are connected to each pair of adjacent stages of the sampling register to indicate the location of each transition. The number of transitions occurring at each location are stored in an up-down type of storage summer which adds to the count when a transition is present and subtracts from the count when a transition is elsewhere, thereby allowing erroneous additions to the count in any of the counters to be effectively removed by subsequent correct bits and providing for a faster dynamic synchronization in response to changes in the location of the transition resulting from sampling clock drift. A counter is employed to count the number of transitions present during any one bit interval, and to cause the system to ignore transitions when more than one transition is present during any bit interval, since more than one transition can only be the result of noise.

The output of the sampling register is coupled to a phase synchronizing register having more stages than the number of stages in the sampling register by means of a delay register. A majority logic circuit is connected to the storage summers and coupled to the phase synchronizing registers to indicate the location of the data transitions in the delay register. Predetermined ones of the stages of the phase synchronizing register are selected depending upon the initial location of the transition in the sampling register. The stages are selected such that the transition occurs near the center of the group of stages selected, and one of the stages adjacent to the transition may be coupled to data utilization means. As the clock drifts, different ones of the initially selected stages are coupled to the utilization means, and since the stages were selected such that the initially selected stage was near the center of the group of selected stages, the loss of a bit resulting from the drift of a transition from the first sample of one bit interval to the last sample of another bit interval is thus avoided, and the introduction of extraneous bits and the removal of valid bits cannot occur.

DETAILED DESCRIPTION

Figures 1, 3:
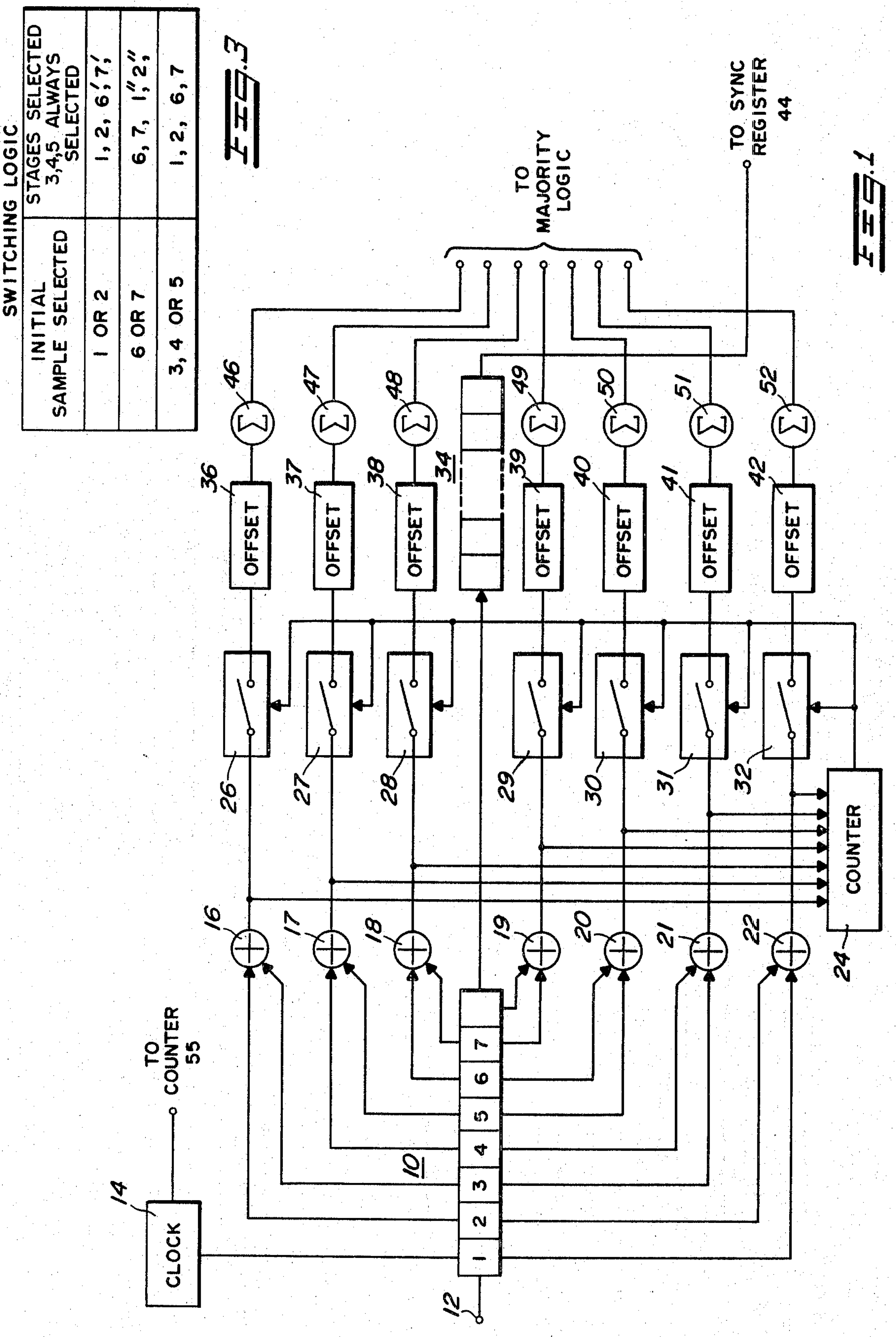
FIG. 1 is a partial block diagram of the system according to the invention showing the sampling register, the sample comparison circuitry, the up-down storage summers, the transition counter circuitry for preventing noisy counts wherein more than one transition occurs and the delay register.
FIG. 3 is a table showing the conditions for selecting stages in the phase synchronizing register corresponding to various locations of the transition in the sample register.

Referring to FIG. 1, which shows a portion of the system according to the invention, a sampling shift register 10 is connected to an input point 12 and a clock 14. A plurality of comparison means such as modulo 2 adders 16–22 are connected to the shift register 10 such that each of the modulo 2 adders has two inputs connected to different adjacent stages of the shift register 10. The output of the modulo 2 adders 16–22 are connected to a counter 24. The output of each of the modulo 2 adders 16–22 is also connected to one of a plurality of switches 26–32, respectively. The output of the counter 24 is connected to each of the switches 26–32 for control thereof. The output of each of the switches 26–32 is connected to one of the accumulators or storage summers 46–52 via one of the offsetting circuits 36–42, respectively. The output of the sampling shift register 10 is connected to the input of a delay register 34 which has an output connected to a phase synchronizing shift register 44, shown in FIG. 2. The outputs of each of the storage summers 46–52 are connected to a majority logic circuit 54, also shown in FIG. 2. Similarly, an output of the clock 14 is connected to a counter 55.

Figure 2:
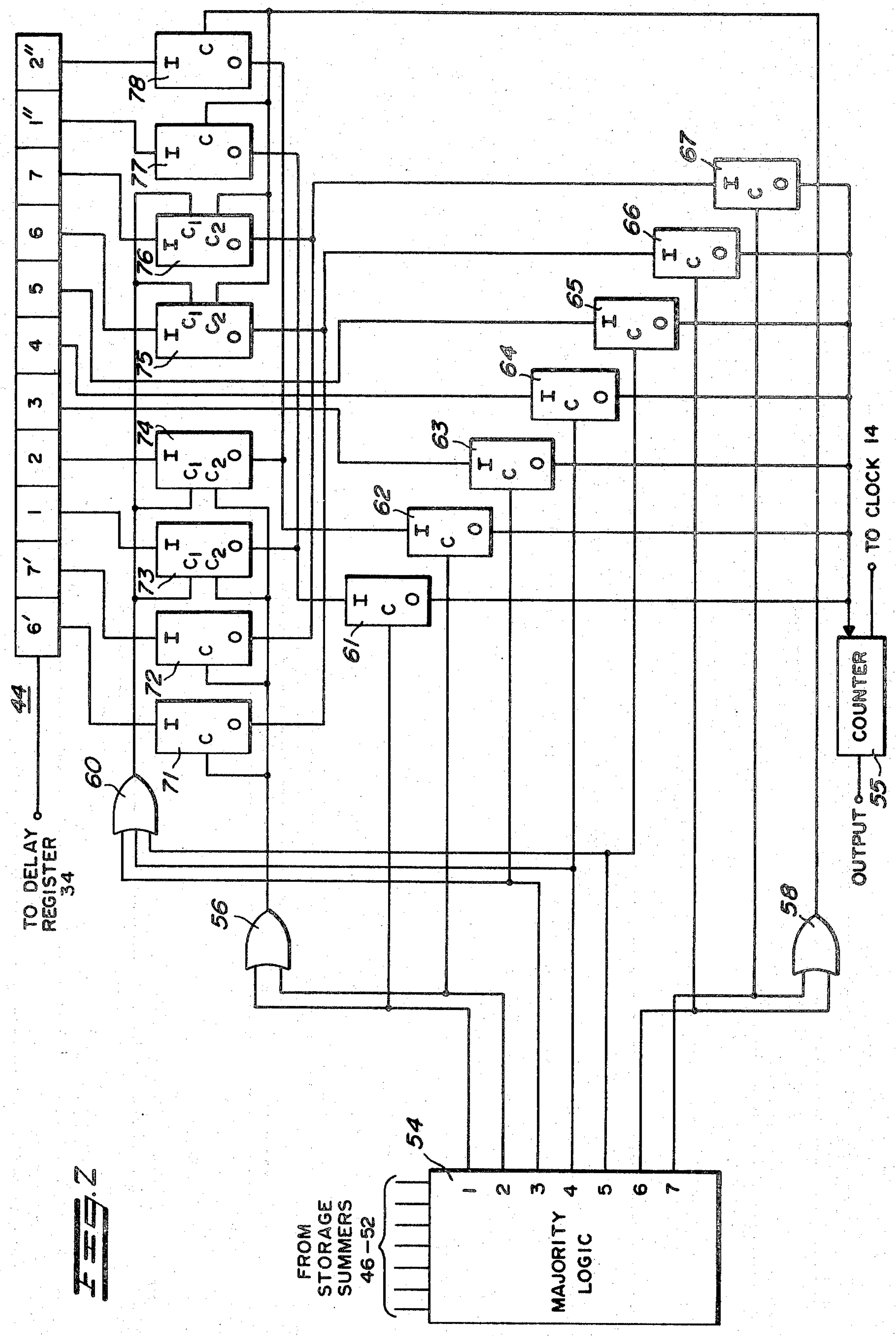
FIG. 2 is a partial block diagram of the system according to the invention showing the majority logic circuit, the phase synchronizing register and the logic circuitry for selecting the transition sample and the stages adjacent to the transition sample.

Referring to FIG. 2, the majority logic circuit 54 has a plurality of outputs, numbered 1–7 in this embodiment. Similar numbers 1–7 are used to designate stages in the sampling register 10 and the delay register 44. The numbers 1–7 do not necessarily denote the same sample of information in FIGS. 1 and 2, but are used to relate samples taken in different bit intervals, as will be explained in a subsequent portion of the specification. The outputs 1 and 2 of the majority logic circuit are connected to the inputs of an OR gate 56, the outputs 6 and 7 are connected to inputs of an OR gate 58 and the outputs 3, 4 and 5 are connected to the inputs of a three input OR gate 60. Each of the outputs 1–7 are connected to the control terminal of one of the transmission gates 61–67, the outputs of which are connected to an input of the counter 55. The output of the OR gate 56 is connected to control terminal of each of the transmission gates 71–74, the output of the OR gate 58 is connected to a control terminal of each of the transmission gates 75–78, and the output of the OR gate 60 is connected to a control terminal of each of the transmission gates 73–76. The inputs of the transmission gates 71–78 are each connected to one of the stages designated as 6′, 7′, 1, 2, 3, 4, 5, 6, 7, 1″ and 2″, respectively, of the phase synchronizing shift register 44. The outputs of the gates 71 and 75; 72 and 76; 73 and 77; and 74 and 78 are connected to the inputs of the transmission gates 66; 67; 61; and 62, respectively. The inputs of the transmission gates 63, 64 and 65 are connected to the stages of the shift register 44 designated as 3, 4 and 5, respectively.

In operation, data to be phase synchronized with the local clock is applied to the input point 12 from a radio receiver, transmission line or other suitable source. The clock 14 provides synchronizing pulses to the register 10 to cause the received data applied to the input point 12 to be sampled at a rate equal to an integral multiple, n, of the bit rate of the data received. The number of stages of the sampling shift register 10 is chosen to exceed the number of samples, n, taken per bit, by one. In the embodiment shown in FIG. 1, seven samples of each received bit are taken, thereby requiring an eight stage shift register 10, however any number of samples and stages may be used. The modulo 2 sum of the contents of each adjacent pair of stages is taken by the modulo 2 adders 16–22. The numbers 1–7 shown in register 10 relate to the first through seventh samples taken during a bit interval.

Whenever there is a transition between the bits of the received data, such as, for example, from a 0 to a 1, or vice versa, there will be a corresponding transition between the last sample of the previous bit and the first sample of the following bit. In the absence of noise, all of the *n* samples following the transition will be the same. Hence, since all of the n samples of each bit must be the same in the absence of noise, and since the number of stages in the sampling register 10 exceeds the number of samples per bit by only one stage, there can be at most only one transition stored in the sampling register 10 at any given time.

The modulo 2 adders 16–22 are connected to adjacent stages of the sample register 10 to detect the presence of a transition. If the samples in any two adjacent stages are the same, such as both 0's or both 1's, the output of the modulo 2 adder connected thereto will be a 0. If the samples are not the same, such as a 1 and a 0, the output of the modulo 2 adder connected to the sampled stages will be a 1. Since, in the absence of noise, all of the samples of a single bit are equal, dissimilar samples can occur only at the transition between bits. Hence, the modulo 2 adder having the 1 output indicates the stages between which the transition has taken place. For example, if the output of the modulo 2 adder 17 is a 1, then the transition has taken place between the samples 4 and 5 in the shift register 10.

The outputs of the modulo 2 adders 16–22 are connected to the counter 24 which counts the number of 1's simultaneously present at the outputs of the modulo 2 adders 16–22. This operation is done once during each bit time. Since the number of 1's provided by the modulo 2 adders 16–22 is representative of the number of transitions present at a given time in the sample register 10, and since in the absence of noise, no more than one transition can be present in the sample register 10, the presence of more than one transition indicates the presence of noise on the received signal. Since noise causes the location of a transition between bits to become ambiguous, the counter 24 is employed to count the number of 1's from the modulo 2 adders 16–22 and to open the switches 26–32 when the count exceeds one, thereby preventing transitions caused by noise from erroneously adjusting the phase of the received data. The counter 24 also opens the switches 26–32 when the count equals zero, indicating an absence of transitions, as when two or more consecutive bits entering the sample register 10 are the same. The accumulators or storage summers 46–52 are designed to have a count that cannot be less than zero nor exceed a predetermined maximum value. Such accumulators are well known to those skilled in the art. The signals from the modulo 2 adders 16–22 are applied to the storage summers 46–52 by means of the offsetting circuits 36–42 which are included to provide a faster and more definite indication of the location of the transition. The offset circuits 36–42 each have a characteristic such that when a 1 is applied thereto, the count in the storage summer connected thereto is advanced by a predetermined increment such as, for example, ½ or 1. When a 0 is applied to one of the offset circuits, the count in the storage summer connected thereto is reduced by a predetermined increment such as ½ or 1.

The data in the sample register 10 is sampled by the modulo 2 adders on a bit-by-bit basis, i.e., after every seventh sample. For example, after the first seven samples, a transition may occur between the 4th and 5th samples stored in the sample register 10. If the frequency of the clock 14 is related to the bit rate of the data by a ratio proportional to the sampling rate, after the next seven samples, which correspond to a one bit interval in this embodiment, the transition between bits should again occur between the samples 4 and 5 if the bits are different from each other. Hence, the output of the modulo 2 adder 17 will be a 1 after each transition (every $7n$ samples, $n \geq 1$), and the output of the other ones of the modulo 2 adders will be a 0. As a result, the count in the storage summer 47 will soon reach its maximum value, and the count in the other ones of the storage summer will remain at 0, since the count, by definition, cannot go negative. Should another transition occur as a result of noise between the samples 2 and 3, for example, a 1 will be added to the count of the storage summer 46. However, if no noise is present during the subsequent bit interval during the time the samples 2 and 3 are taken, there will again be no transition between the samples 2 and 3, thereby causing a 0 to be applied to the offset circuit 36, which in turn will apply a negative 1 to the storage summer 46, to thereby remove the error caused by the noise on the previous bit from the count in the storage summer 46. Hence, the use of the offsetting circuits 36–42 provides an effective noise cancellation technique for removing noise created errors when a relatively noise free bit is received. The aforementioned technique allows several noise created errors to be corrected by a single noise free bit since one correctly received bit will provide a negative count to all of the storage summers 46–52, except the one coupled to the modulo 2 adder showing the correct transition, thereby reducing erroneous counts that may have been applied to any of the storage summers during previous bit intervals.

The up-down counting provided by the offset circuit-storage summer combination also provides for a faster relocation of the transition in the event of drift of the clock 14 relative to the bit rate of the received data. For example, if due to clock drift after several bits of data have been received, the transition occurs between the samples 3 and 4 rather than 4 and 5, the output of the modulo 2 adder 21 will be a 1, and a 1 will be added to the count in the storage summer 51 after each bit interval containing a transition. Simultaneously, the count in the storage summer 47 will be reduced by 1 after each bit interval containing a transition, thereby resulting in a buildup of the count in the storage summer 51 and a simultaneous reduction in the count in the storage summer 47, thereby allowing the new transition to be located when the count in the storage summer 51 exceeds the count in the storage summer 47.

Whenever the clock 14 drifts with respect to the data, the phase of the data must be altered to maintain the data in synchronism with the clock. The phase shifting is provided by the circuitry shown in FIG. 2. The data from the circuit of FIG. 1 is applied to the circuit of FIG. 2 from the sampling register 10 to the phase synchronizing register 44 by means of the delay register 34. The number of stages in the delay register 34 is selected such that a delay equal to an integral number of bits is provided between the sample 7 of the sampling register 10 and the sample 1 of the phase synchronizing register 44. In addition, the delay must be of sufficient duration to allow the count in the storage summer corresponding to the transition to build up to a value exceeding the counts in the other storage summers by a predetermined amount. For example, if 8 bits are required to locate the transition, and if 7 samples are taken per bit, then a total of 56 stages are required between the stage corresponding to sample 7 of the sampling register 10 and the stage corresponding to sample 1 of the phase synchronizing register 44. The delay may be provided by using a separate shift register 53 stages (56 stages less the last stage of shift register 10 and the first two stages of shift register 44), or a single long shift register may be employed to provide the function of the registers 10, 34 and 44.

The outputs of the storage summers 46–52 of FIG. 1 are connected to inputs of the majority logic circuit 54 of FIG. 2. The majority logic circuit 54 is a standard majority logic circuit, well known in the art, which provides an output signal at one of its outputs which indicates which of the storage summers 46–52 has the highest count. For example, if the transition occurs between the 4th and 5th samples and the storage summer 47 has the highest count, then the signal at output 4 of the majority logic circuit 54 will be a 1 and the signals present at the other outputs will all be 0's. The output signals from the majority logic circuit 54 are used to control the operation of the transmission gates 61–67, and the transmission gates 71–78 by means of the OR gates 56, 58 and 60. If we assume, as we have in the previous discussion, that the transition occurs between samples 4 and 5 in the sample register 10, then the output signal at the output 4 of the majority logic circuit 54 will be a 1, thereby allowing the contents corresponding to sample 4 in the phase synchronizing register 44 to be applied to the counter 55. The counter 55 is employed to convert the $n$ samples into recovered bits. The counter 55 also receives an enabling signal from the clock 14 at the start of each bit period to start a counting sequence in which the samples in the stage coupled to the counter 55 are counted. For example, in the present embodiment, seven samples are taken during each bit period, and if the bit being sampled is a 1, then the maximum count provided by the counter during each bit period is seven. If the sampled bit is a 0, and no noise is present, then the output of the counter 55 during a bit interval will be zero. In order to provide for a margin of error, the counter 55 may be programmed to provide an output when the count therein exceeds a predetermined number, such as, for example, three. Hence, the counter 55 will provide an output indicative of a 1 when the count exceeds three, and an output indicative of a 0 when the count is equal or less than three during any bit period, to allow up to three samples to be erroneous without causing an error in the output of the counter 55.

As the samples are shifted through the phase synchronizing register 44 the counter counts the number of 1's present in one of the stages of the register 44 during each bit interval and provides an output indicative of a 1 if the count exceeds a predetermined number or a 0 if the count is equal or less than a predetermined number. If, as was described before, the contents of the register 44 corresponding to the sample 4 were being sampled, and the transition lay between the samples 4 and 5 of the shift register 10, then the count would begin immediately after the transition and last for exactly a one bit interval, thereby allowing each sample of the bit following the transition to be counted by the counter 55. If, however, as previously described, the transition shifted to a position between samples 3 and 4 in the sampling register 10, and the contents corresponding to the sample 4 in the register 44 were applied to the counter 55, the last sample of one bit and the first 6 samples of a following bit would be counted by the counter 55 during each bit interval. However, as the transition shifts to the position between samples 3 and 4 of the sampling register 10, the count of the storage summer 51 soon exceeds the count of the storage summer 47, thereby causing the output signal at the output 3 of the majority logic circuit 54 to be a 1 and the other outputs of the majority logic circuit 54 to be 0's. The 1 present at the output 3 of the majority logic circuit 54 causes the transmission gate 63 to couple the stage corresponding to sample 3 of the phase synchronizing register 44 to the counter 55, thereby allowing the count to commence soon after the transition which is now located between samples 3 and 4.

The portion of the system heretofore described works well for transitions occurring near the center of a bit interval, i.e., near the samples 3, 4 or 5. If however, the transition occurs near the beginning or end of a bit interval, namely at samples 1 or 2, or 6 or 7, respectively, and the clock drifts sufficiently to allow the transition to shift, for example, from between samples 1 and 2 to between samples 1 and 7, then the switching of the taps in the phase synchronizing register 44 could result in the same bit being sampled twice. Conversely, if the transition initially followed the sample 7, and as a result of clock drift, the transition moved to the location between samples 1 and 2, the switching of the taps from sample 7 to sample 1 in the phase synchronizing register 44 would result in the loss of an entire bit.

Because such additions or losses of data cannot be tolerated, the system according to the invention provides for additional stages in the phase synchronizing register 44 and additional logic circuitry including the OR gates 56, 58 and 60 and the transmission gates 71–78 to allow a phase correction in excess of a one bit interval to be made. The system as illustrated below sets up an initial seven sample window at the beginning of the data over which samples may be taken during subsequent reception of data.

The transmission gates 63–65 are directly connected to the majority logic circuit 54 and are interposed between the counter 55 and the respective stages corresponding to samples 3–5 of the phase synchronizing shift register 44. The samples 3–5 are always sampled regardless of the initial location of the transition in the sampling register 10. The other stages to be sampled are selected in response to the location of the initial transition in the register 10. If the initial transition follows the sample 1 or 2, which results in a 1 occurring at one of the outputs 1 and 2 of the majority logic circuit 54, then the OR gate 56 provides an output to the control terminals of the transmission gates 71–74 to allow the stages corresponding to samples 6', 7', 1 and 2 of the phase synchronizing register 44 to be applied to the counter 55. The samples 6' and 7' correspond to samples taken during a seven sample interval other than the interval during which the samples 1–7 were taken. Accordingly, if the stage initially sampled in the shift register 44 corresponding to sample 1, and the clock drifted sufficiently to cause the transition to occur between the first sample of 1 bit and the last sample of the preceding bit, then the stage corresponding to sample 7' would be sampled rather than the stage corresponding to the sample 7, thereby avoiding loss or duplication of bits.

If the initial transition results in an output signal at outputs 3, 4 or 5 of the majority logic circuit 54, then the OR gate 60 applies a signal to the control terminals of the transmission gates 73–76 to define the window for subsequent shifts which may result from clock drift to allow the shift to be made anywhere between the stages corresponding to sample 1 and sample 7 of the register 44. If the initial transition results in an output signal at the output 6 or 7 of the majority logic circuit 54, the OR gate 58 applies a signal to the transmission gates 75–78 to allow the samples 6, 7, 1'' and 2'' to be sampled. The rules for selecting the stages to be sampled are summarized in the table of FIG. 3.

The system described in the foregoing provides a phase synchronizing system that can accomodate clock drifts which exceed a bit interval by up to ±2 samples. Similar systems which can accomodate drifts exceeding a bit interval by ±3, ±4, etc samples. In such a system, the length of the phase synchronizing register 44 would be increased to accomodate the additional drift, and appropriate logic circuitry would be added to provide the optimum range of correction for each initially selected transition.

The embodiments of FIGS. 1 and 2, including the apparatus for selecting the stages of the phase synchronizing register 44 to be sampled, have been shown to illustrate the operation of the invention, however, it should be noted that other embodiments and other ways of selecting stages will be readily apparent to those skilled in the art, and such other systems, including systems employing parallel sampling of n stages also fall within the scope and spirit of the invention.

What is claimed is:

1. An adaptive phase synchronizing system for synchronizing the phase of a received digital signal having a plurality of bits, each bit having a predetermined bit interval, to correspond to the phase of a local clock, said system comprising:

means for receiving said digital signal;

sample and storage means connected to said receiving means for taking a predetermined number, *n*, of samples of said received digital signal during each bit interval, said sample and storage means including a shift register having $n + 1$ stages for storing said samples;

*n* modulo 2 adders, each having two inputs connected to a different pair of adjacent ones of said $n + 1$ stages, and an output, each of said modulo 2 adders being responsive to the samples stored in the stages connected thereto to provide a transition signal when the last mentioned samples are unequal;

a counter connected to the output of each of said modulo 2 adders, said counter being responsive to said transition signals for providing an error signal when more than one transition signal is simultaneously provided by said modulo 2 adders;

accumulator means coupled to the output of each of said modulo 2 adders, said accumulator means being responsive to said modulo 2 adder means for a predetermined sampling period once during each bit interval for counting the number of transition signals provided by each of said modulo 2 adders and providing a count signal having a value representative of said number of transition signals provided by each one of the modulo 2 adders, said accumulator means including means for reducing the value of each of said count signals corresponding to the modulo 2 adders not providing transition signals during said predetermined sampling period;

switch means connected to said accumulator means and said counter, said switch means being responsive to said counter for rendering said accumulator means non-responsive to said modulo 2 adders for the predetermined sampling period concurrent with the presence of said error signal, or the absence of a transition from 0 to 1 or from 1 to 0;

majority logic means connected to said accumulator means and responsive to the accumulator means having the highest value count signal to provide a sample identifying signal at an output terminal thereof for identifying one of said *n* samples having a transition adjacent thereto;

delay means connected to said sample and storage means for receiving and delaying said samples;

variable phase shifting means connected to said delay means for receiving delayed samples therefrom, said variable phase shifting means including a shift register having a second predetermined number, *p*, of stages greater than the predetermined number, *n*;

logic means coupled to said majority logic means and said variable phase shifting means for selecting *n* adjacent ones of said *p* stages in response to said sample identifying signal; and data generating means coupled to said *n* adjacent ones of said *p* stages selected by said logic means, said data generating means being responsive to the samples present in one of said selected n stages for generating one data bit in response to said last mentioned samples during each bit interval of said received digital signal.

2. A system as recited in claim 1 wherein said data generating means includes gating means having a plurality of inputs and an output, said inputs being coupled to said majority logic means and said n selected stages, said gating means being responsive to said majority logic means for coupling one of said n selected stages to said output.

3. A system as recited in claim 2 wherein said samples include 1's and 0's, said system further including second counter means connected to the output of said gating means for counting the number of one of said 1's and 0's present in up to *n* successive samples, said second counter including means for providing a 1 when the number of counted signals exceeds a third predetermined number in the range of 1 to *n*.

4. A system as recited in claim 3 wherein said gating means includes n transmission gates, each of said transmission gates having an input coupled to one of said n selected stages, an output coupled to said second counter means and a control terminal, each of said control terminals being coupled to said majority logic means.

5. A system as recited in claim 4 wherein said majority logic means has n outputs representative of said n samples, each one of said n outputs of said majority logic means being connected to the control terminal of one of said transmission gates.

6. A system for synchronizing the phase of a received digital signal having a plurality of bits, each bit having a predetermined bit interval, to correspond to the phase of a local clock, said system comprising:

means for receiving said digital signals;

sample and storage means connected to said receiving means for taking a predetermined number of samples of each bit of said digital signal, said sample and storage means having a plurality of stages including a first stage and a last stage for storing said samples, the number of said stages exceeding said predetermined number of samples taken of each bit by one, said sample and storage means including means responsive to said local clock for shifting said samples between said stages from said first stage to said last stage thereof;

comparison means connected to each of said stages of said sample and storage means for comparing the contents of said stages, said comparison means including means responsive to unlike contents in adjacent stages of said sample and storage means for providing a transition signal indicative of each transition of information between adjacent stages;

counting means connected to said comparison means for counting the number of transitions present simultaneously in said sample and storage means;

accumulator means responsive to transition signals for a predetermined period once during each bit interval for counting the number of transitions of information between each pair of adjacent stages during the receipt of said digital signals and for storing a count signal representative of the number of transitions of information between each pair of adjacent stages, said accumulator means including means for increasing the count signals upon the occurrence of a transition of information between adjacent stages and for reducing the count signals in the absence of a transition of information;

switch means connected to said comparison means, said accumulator means and said counting means, said switch means being responsive to said counting means to make said accumulator means nonresponsive to said transition signals whenever the number of transitions present simultaneously in said sample and storage means is zero or exceeds one:

majority logic means connected to said accumulator means and responsive thereto for providing a location signal representative of the pair of stages having the highest number of transitions therebetween during the receipt of said digital signals;

delay means having an input connected to said sample and storage means for receiving said samples, and an output; and variable phase shifting means connected to the output of said delay means for receiving said samples and to said majority logic means, said variable phase shifting means including means for shifting the phase of said samples by a predetermined amount over a predetermined range in excess of one bit interval in accordance with the pair of stages having the highest number of transitions.

7. A system as recited in claim 6 wherein said variable phase shifting means includes second sample and storage means having a predetermined number of stages greater than the number of stages in said sample and storage means, logic means coupled to said majority logic means and responsive to said location signal for selecting predetermined selected ones of said stages of said sample and storage means, and output means coupled to said logic means and said selected ones of said stages, said output means being responsive to a predetermined one of said selected stages in response to said majority logic means for providing an output signal representative of the samples in said predetermined one of said selected signals.

8. A system as recited in claim 7 wherein said second sample and storage means includes a shift register having a plurality of stages equal in number to the number of stages in said second sample and storage means, said logic means including gating means having a plurality of input terminals, an output terminal and a control terminal, each of said input terminals being connected to one stage of said shift register and said control terminal being connected to said majority logic means, said gating means being responsive to said majority logic means for coupling predetermined ones of said shift register stages to said output terminal, said output means being connected to said output terminal.

9. A system as recited in claim 8 wherein said samples each have one of a first and second value and said output means includes a counter responsive to the value of said samples for providing a first sense output signal upon receipt of a predetermined number of samples having said first value within said bit interval.

10. A system as recited in claim 6 wherein said comparison means includes a plurality of modulo 2 adders, each modulo 2 adder having a pair of inputs connected to a different respective pair of adjacent stages of said sample and storage means.

* * * * *